United States Patent
Horng et al.

(10) Patent No.: US 7,394,625 B2
(45) Date of Patent: Jul. 1, 2008

(54) STRUCTURE/METHOD TO FORM BOTTOM SPIN VALVES FOR ULTRA-HIGH DENSITY

(75) Inventors: Cheng T. Horng, San Jose, CA (US); Ru-Ying Tong, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 128 days.

(21) Appl. No.: 11/389,677

(22) Filed: Mar. 27, 2006

(65) Prior Publication Data

US 2006/0181815 A1  Aug. 17, 2006

Related U.S. Application Data

(62) Division of application No. 10/460,088, filed on Jun. 12, 2003, now Pat. No. 7,042,684.

(51) Int. Cl.
*G11B 5/39* (2006.01)
(52) U.S. Cl. .................................. 360/324.12
(58) Field of Classification Search ........... None
See application file for complete search history.

(56) References Cited

U.S. PATENT DOCUMENTS

| | | | |
|---|---|---|---|
| 6,268,985 B1 | 7/2001 | Pinarbasi | |
| 6,338,899 B1 | 1/2002 | Fukuzawa et al. | |
| 6,348,274 B1 | 2/2002 | Kamiguchi et al. | |
| 6,466,418 B1 | 10/2002 | Horng et al. | |
| 6,785,954 B2 | 9/2004 | Horng et al. | |
| 6,993,827 B2 | 2/2006 | Horng et al. | |
| 2005/0047028 A1* | 3/2005 | Fukuzawa et al. | 360/324.1 |
| 2006/0162148 A1* | 7/2006 | Horng et al. | 29/603.08 |

* cited by examiner

*Primary Examiner*—Angel A Castro
(74) *Attorney, Agent, or Firm*—Saile Ackerman LLC; Stephen B. Ackerman

(57) ABSTRACT

Two embodiments of a GMR sensor of the bottom spin valve (BSV) spin filter spin valve (SFSV) type are provided together with methods for their fabrication. In each embodiment the sensor includes an in-situ naturally oxidized specularly reflecting layer (NOL) which is a more uniform and dense layer than such layers formed by high temperature annealing or reactive-ion etching. In one embodiment, the sensor has an ultra thin composite free layer and a high-conductance layer (HCL), providing high output and low coercivity. In a second embodiment, along with the same NOL, the sensor has a laminated free layer which includes a non-magnetic conductive layer, which also provides high output and low coercivity. The sensors are capable of reading densities exceeding 60 Gb/in$^2$.

14 Claims, 5 Drawing Sheets

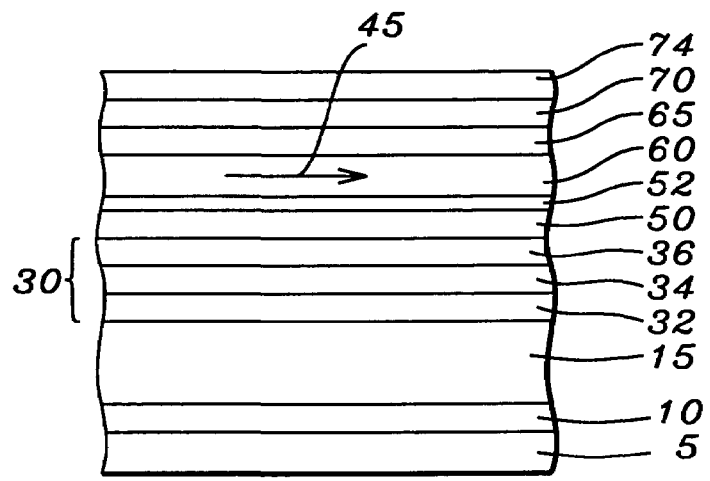
FIG. 1a – Prior Art
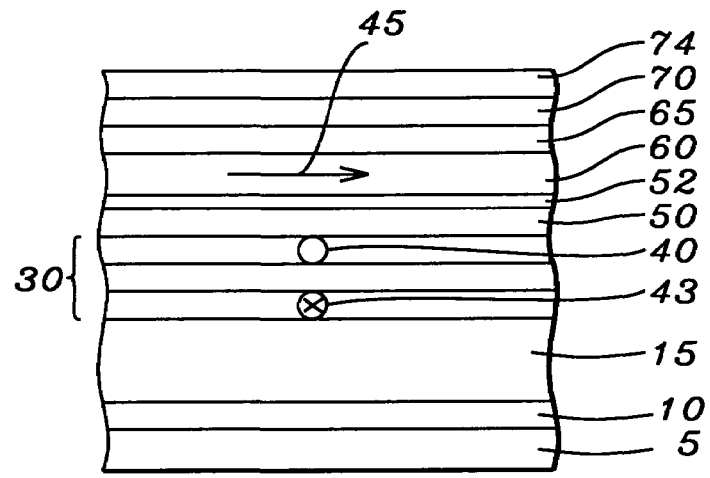
FIG. 1b – Prior Art
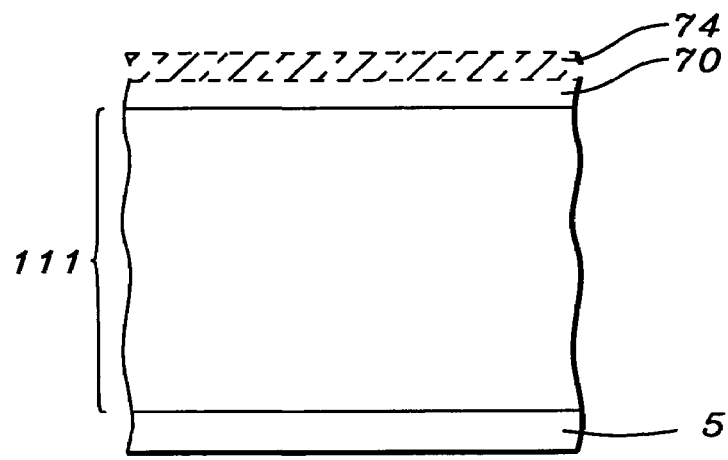
FIG. 1c – Prior Art

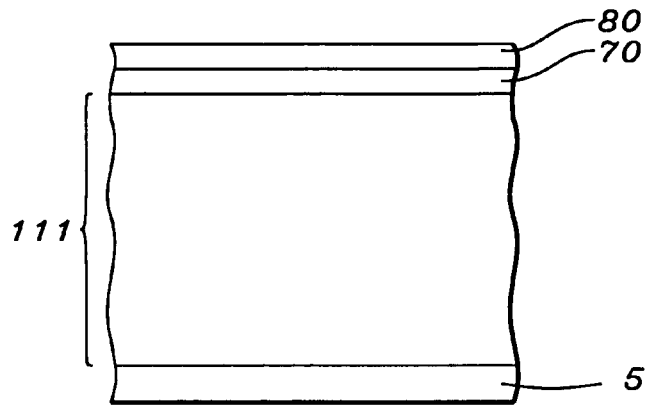
FIG. 1d – Prior Art
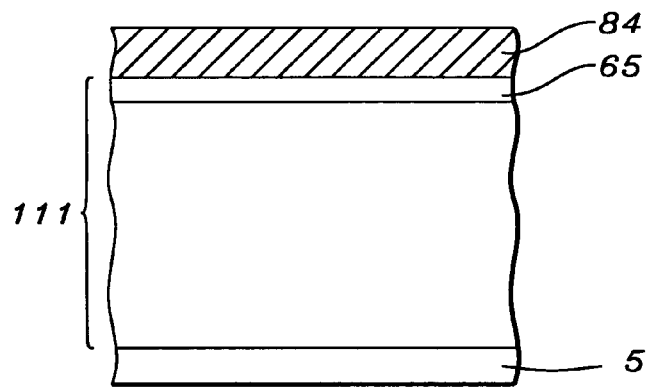
FIG. 1e – Prior Art
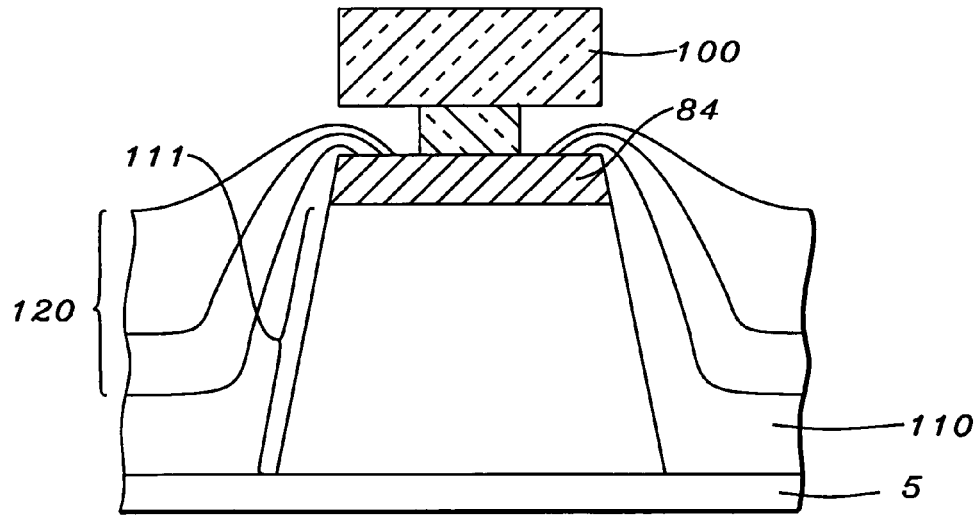
FIG. 1f – Prior Art

STRUCTURE/METHOD TO FORM BOTTOM SPIN VALVES FOR ULTRA-HIGH DENSITY

This is a Divisional Application of U.S. patent application Ser. No. 10/460,088 filed on Jun. 12, 2003 now U.S. Pat. No. 7,042,684, which is herein incorporated in its entirety and is assigned to a common assignee.

RELATED PATENT APPLICATION

This application is related to, Ser. No. 10/460,086, filing date Jun. 12, 2003, and to, Ser. No. 10/124,004, filing date Apr. 17, 2002, both assigned to the same assignee as the current invention.

BACKGROUND OF THE INVENTION

1. Field of the Invention

This invention relates generally to the fabrication of a giant magnetoresistive (GMR) magnetic field sensor of the spin-filter synthetic bottom spin-valve (SFBSV) type and more specifically to a method for forming a TaO specularly reflecting layer in direct contact with a free magnetic layer by an in-situ process of natural oxidation.

2. Description of the Related Art

Magnetic read heads whose sensors make use of the giant magnetoresistive effect (GMR) in the bottom spin-valve configuration (BSV) are being increasingly required to read information recorded on magnetic media at ultra-high area densities (e.g. >45 Gb/in$^2$). The typical BSV sensor configuration includes (in vertically ascending order) a pinning layer, a pinned layer, a conductive spacer layer, a ferromagnetic free layer and a capping layer. Sensing current is introduced into and extracted from this configuration by laterally disposed leads. Again, typically, the pinning layer is a layer of antiferromagnetic material (AFM) which pins (fixes in space) the magnetic moment of the pinned layer (typically a layer of ferromagnetic material) in a direction normal to the plane of the air-bearing surface (ABS) of the sensor. The magnetic moment of the ferromagnetic free layer, not being pinned, is free to rotate with respect to that of the pinned layer under the influence of external magnetic fields and it is those rotations that cause the resistance of the sensor, R, to vary (dR) and, in combination with the sensing current, to produce an electrical signal. The GMR effect, which is relied upon to give maximum resistance variations, dR, for given rotations of the free layer magnetic moment, is a result of the scattering of conduction electrons in the spacer layer by the surfaces of the pinned and free layers that bound it. This scattering is spin-dependent and a function of the relative orientations of the two magnetic moments.

In order for the dR to be reproducible and invariant under symmetric changes in the external field, the magnetic moment of the free layer should return to the same position (the bias point) when no external magnetic signals are present (the quiescent state). The bias point of the free layer is typically made to be perpendicular to the pinned moment of the pinned layer, ie. in the plane of the ABS.

To be capable of reading ultra-high area densities, the BSV sensor must be able to resolve extremely high linear bit densities, bits-per-inch, (BPI) and track densities, tracks-per-inch, (TPI), which, in turn, requires that it have an extremely narrow trackwidth and ultra-thin free layer (thickness <20 angstroms) to maintain high signal output. Unfortunately, as the free layer is made increasingly thin, it becomes difficult to obtain a controllable bias point, a high GMR ratio (dR/R) and good softness (low coercivity). Utilizing synthetic antiferromagnetic (SyAF) pinned layers (ferromagnetic layers coupled with their magnetic moments antiparallel) can reduce magnetostatic fields between the pinned and free layers which adversely affect the biasing; but if the free layer is sufficiently thin, even the magnetic fields produced by the sensing current have an adverse affect.

To overcome this significant problem, a spin-filter spin valve (SFSV) configuration has been introduced in which the free layer is placed between the usual Cu spacer layer and an additional high-conductance-layer (HCL). This configuration reduces the sense current field in the free layer by shifting the sense current center towards the free layer. This results in the sense current producing a small bias point shift. In addition, the SFSV configuration allows the use of an ultra-thin CoFe free layer which, when combined with a properly formed HCL, has an advantageous small positive magnetostriction combined with a high output. The spin-filter spin valve in the bottom spin valve configuration utilizing a synthetic antiferromagnetic pinned layer will hereinafter be denoted a "synthetic SFBSV" structure.

Attempts have been made in the prior art to improve the GMR ratio of the synthetic SFBSV structure. One approach has been the formation of a specularly reflecting capping layer between the free layer and the conducting lead layer. Such a layer acts like a mirror and effectively lengthens the paths of conduction electrons within the free layer so that the resistive variations of GMR effect can yield a maximal output signal. As is disclosed in the related Patent Applications, Ser. No. 10/124,004, filing date Apr. 17, 2002, both fully incorporated herein by reference, a particularly advantageous method of forming such a specularly reflecting capping layer is by oxidizing a Ta capping layer during an Ar/O$_2$ reactive ion etch (RIE) process used to pattern a lead overlay (LOL) layer on the sensor. Such an RIE process is particularly advantageous is forming patterned lead layers that define the ultra-narrow (between 0.19 and 0.11 microns) magnetic read widths required to read densities up to and beyond 100 Gb/in$^2$. The etch thereby serves the dual purpose of patterning the lead layer and, in the process, oxidizing the capping layer beneath it. The advantageous effects of such TaO specularly refecting layers are also taught by Horng et al. (U.S. Pat. No. 6,466,418) who incorporate such a layer within a bottom spin valve structure which is not of the spin-filter spin valve configuration. Kamiguchi et al. (U.S. Pat. No. 6,348,274) also teach the specularly reflecting properties of oxide layers formed on a variety of magnetic layers withing GMR structures. They particularly teach the advantages of such specularly reflecting layers within the pinned layer of a GMR spin valve structure. Pinarbasi (U.S. Pat. No. 6,268,985) teaches a laminated capping layer which does not increase the coercivity of the free layer upon annealing. Fukuzawa et al. (U.S. Pat. No. 6,338,899) discuss the advantageous nature of oxidized metallic layers and also teach the formation of TaO layers in a variety of spin valve configurations.

The particular method by which a Ta capping layer is oxidized can have an important effect on the performance of the sensor. The present inventors have found that oxidation by plasma etching produces an oxide layer that is of low density and non-uniformity. If, for example, the Ta layer is under-etched, producing an under-oxidized surface, then specular reflection is not as effective as that produced by naturally oxidized Ta. Conversely, if the Ta layer is over-etched (over-oxidation), the energetic oxygen ions in the RIE plasma may damage the free layer beneath the capping layer. In either under or over oxidation, the S/N (signal to noise) ratio of the sensor is degraded. The present invention will disclose a method for naturally oxidizing a Ta layer in-situ, to produce a specularly reflecting layer capped with a uniform oxide formation of a thickness that yields a greatly enhanced GMR ratio (dR/R).

SUMMARY OF THE INVENTION

It is a first object of the present invention to provide a high signal output, bottom spin valve (BSV) giant magnetoresistive (GMR) sensor of the spin filter spin-valve (SFSV) type having a high-conductance layer, a synthetic antiferromagnetic (SyAF) pinned layer and capable of reading high area density magnetic recordings of densities exceeding 100 Gb/in$^2$ (gigabits per square inch).

It is a second object of the present invention to provide such a BSV SFSV GMR sensor having a uniformly naturally oxidized layer for producing specular reflection wherein the process of forming said layer does not degrade the properties of the sensor.

It is a third object of the present invention to provide a method of forming the BSF SFSV GMR sensor having the properties and advantages described above.

The objects of the present invention will be achieved by applying a novel in-situ natural oxidation process to a novel specularly reflecting layer in a SyAF BSV SFSV GMR sensor stack (a "stack" being the unpatterned arrangement of layers). A prior art version of such a stack and its method of formation, which does not fulfill the objects of the present invention but provides a reference for comparison purposes, is illustrated in cross-sectional (ABS plane) schematic form in FIGS. 1a-d. The stack has the following generic (prior art) configuration:

buffer layer/AFM pinning layer/SyAF pinned layer/spacer layer/oxygen surfactant layer/ferromagnetic free layer/high conductance layer/capping layer(oxidized).

Referring to FIG. 1a, there is shown a substrate (5) on which is formed a buffer layer (10), which would typically be a layer of NiCr (with approximately 40% Cr by atomic weight) formed to a thickness of approximately 55 angstroms. On the buffer layer is formed an antiferromagnetic pinning layer (15), which is normally a layer of antiferromagnetic material such as MnPt and is formed to a thickness of approximately 125 angstroms. On the pinning layer is formed an SyAF pinned layer (30), which is a trilayer comprising a second ferromagnetic layer (32), a first ferromagnetic layer (36) and a coupling layer (34) of a material and critical thickness designed to coupled the magnetic moments of the ferromagnetic layers in antiparallel directions. In all that follows, the ferromagnetic layer closest to the pinning layer is designated the "second" layer, while the ferromagnetic layer closest to the spacer layer (50) is designated the "first" layer; this is unrelated to the order of their formation. Typical of the prior art would be second and first ferromagnetic layers both formed of CoFe and of approximate thicknesses 15 and 20 angstroms respectively, the first layer being typically thicker than the second to obtain a higher exchange coupling. The coupling layer (34) producing the antiparallel magnetic moment configuration is typically a layer of Ru formed to a thickness of approximately 7.5 angstroms. This is a critical thickness as it is required to make the antiparallel configuration energetically favorable. A non-magnetic spacer layer (50) is then formed on the SyAF, the spacer layer being typically a layer of Cu approximately 18 angstroms in thickness separating the pinned layer from the free layer and formed in an oxygen ambient so that a very thin layer (an atomic mono-layer) of oxygen (52) is adsorbed on the surface distal from the pinned layer. This is the oxygen surfactant layer. As noted earlier, the spacer layer is a region of spin-dependent scattering of conduction electrons and its material composition and thickness is critical to obtaining the GMR effect of the sensor. The ferromagnetic free layer (60) is formed on the oxygen surfactant layer of the spacer layer. This layer can be a single material layer or a composite layer and its thickness is critical to the definition of the resolution of the sensor. For example, for sensors operating in the 45 Gb/in$^2$ range, a CoFe(10)—NiFe(20) composite free layer has been used, whereas for sensors operating in the 60 Gb/in$^2$ range, a thinner composite CoFe(5)—NiFe(20) free layer has been used. The magnetization of the free layer is typically set at a later point in the sensor formation, when it is set in the plane of the ABS and in the plane of the free layer itself, this direction being hereinafter referred to as the longitudinal direction, and is indicated in the figure as arrow (45). A high-conductance layer (HCL) (65) is then formed on the free layer, the HCL being typically a layer of Ru formed to a thickness of approximately 10 angstroms. The purpose of this layer is twofold, first to provide a high-conductivity channel to direct the sensing current along the free layer and, thereby, to significantly reduce or eliminate the magnetic field of the sensing current as a mechanism for adversely affecting the free layer bias point and, second, to act as a barrier to oxygen diffusion into the free layer during processing steps that pattern the trackwidth of the sensor. This latter role will be discussed further below.

Finally, a capping layer is formed on the HCL, typically a Ta layer (70) approximately 30 angstroms thick on which is formed an additional capping layer of Ru (74) of approximately 10 angstroms thickness. The reason for the additional Ru layer (74) will now be discussed, following which the role of the HCL Ru layer (65) will be discussed.

Referring next to FIG. 1b, there is shown a schematic diagram of the stack in FIG. 1a which has now been subjected to an annealing process to fix the magnetization of the SyAF pinned layer. The magnetic moments of the two ferromagnetic layers produced by this anneal are indicated as oppositely directed arrows (circle (40) and circle with cross (43)) normal to the cross-sectional plane of the drawing and the air bearing surface (ABS) of the sensor and are respectively out of and into the plane. This normal direction is hereinafter called the transverse direction.

The annealing of the stack to fix the magnetization of the SyAF pinned layer in a direction transverse to the air-bearing surface (ABS) (280° C. at 10 K Oe) typically takes place in a moderate pressure (approx. 10$^{-3}$ torr) oven. It was found that the annealing caused delamination of the stack. A solution to this problem was found to be the deposition of the additional 5-10 angstrom Ru capping layer (74) on the Ta capping layer (70). By so doing, however, the Ta is not oxidized during the anneal and the advantageous specularly reflecting layer is not formed.

The importance of the specularly reflecting property of a properly oxidized Ta layer to the performance of the sensor has been shown experimentally by annealing stack formations with varying thicknesses of Ta capping layers at 270° C. for 5 hours in a vacuum oven. The results are shown graphically in FIG. 2, where the GMR ratio (dR/R) is taken as an indication of sensor performance and it can be seen that performance peaks at a GMR of about 16.8% in the Ta thickness range between 5 and 10 angstroms. Under such high vacuum conditions it was shown that approximately 8 angstroms of the Ta capping layer is oxidized. These results indicate that the reason for the effectiveness of the 5-10 angstroms thick Ta layer is the fact that it is oxidized down to its contact with the free layer. The thicker Ta layers (10-20 angstroms) do not oxidize completely, so an unoxidized layer of Ta remains in contact with the free layer.

In a separate experiment performed in an air ambient, a total of 8 angstroms of the Ta is rapidly oxidized to form a TaOx layer of approximately 20 angstroms thickness. The TaOx formed has a composition close to $Ta_2O_5$. Both experiments indicate that Ta oxidizes rapidly and that the oxidation process is self-stopping once the TaOx layer is grown to about 20 angstroms in thickness.

As taught in related patent application Ser. No. 10/124,004, filing date Apr. 17, 2002, which is fully incorporated herein by reference, the design of sensors capable of reading high density recordings (up to 100 Gb/in$^2$) require the deposition and patterning of lead and bias layers to produce magnetic read-widths (the effective width of the active portion of the sensor) as small as 0.11 microns. To obtain such narrowness, the physical track-width of the sensor (the actual width of the active region) must be even smaller, as the response of the sensor extends laterally beyond the physical width. The following figures summarize the patterning steps applied to this prior art sensor stack.

Referring now to FIG. 1c, there is shown, without detail, the annealed stack (111) to which an IBE is now applied to remove the additional Ru capping layer (74). The capping layer is shown as a shaded region bounded by broken lines to indicate that it has been removed.

Referring now to FIG. 1d, there is shown an ion-beam deposition (IBD) used to deposit an additional 30 angstrom thick Ta layer (80) on the exposed Ta layer (70) on the fabrication of FIG. 1c. The resulting Ta capping layer ((70)+(80)) is now approximately 60 angstroms thick.

Referring to FIG. 1e, there is shown the results of the application of an argon/oxygen RIE which is used to oxidize the aforesaid capping layer to form a layer of TaOx (84). As discussed in relation to the graph of FIG. 2, a Ta layer of this thickness will not oxidize in an advantageous manner. At this point in the process the Ru HCL layer (65) serves also as an oxygen diffusion barrier to prevent damage to the free layer.

Referring now to FIG. 1f, there is shown the use of a lift-off photoresist mask (100) first as an etch mask to pattern the TaOx capped sensor stack by forming abutted junctions and then as a deposition mask to deposit against those junctions a CoCrPt hard (high coercivity) longitudinal bias layer (110) of approximately 200 angstroms thickness and, over it, a composite Ta(25)/Au(300)/Ta(150) conducting lead layer (120). The final 150 angstroms thick Ta layer of the lead layer is a protective layer which is used to allow the cleaning-off of unavoidable over-spray (150) which forms over the sensor beneath the mask.

The present invention is motivated by the desire to obtain the advantageous properties of a well formed TaOx specular reflecting layer in direct contact with a ferromagnetic free layer, while still covering the Ta layer with a Ru layer to prevent delamination problems and while still preventing the diffusion of oxygen into the free layer. The formation of the TaOx layer by an argon/oxygen etch as in the prior art does not lead to a layer with the uniformity and density required to provide the best specular reflection. The present invention will teach an in-situ natural oxidation alternative to the formation of TaOx layers by RIE or by long-time annealing at high temperatures.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying figures, wherein:

FIGS. 1a-f are schematic drawings of the formation of a generic, prior art, SyAP BSV SFSV sensor configuration and its patterning.

DESCRIPTION OF THE PREFERRED EMBODIMENTS

To meet the objects of the present invention, the generic configuration written below as configuration iii) and its method of formation and patterning (as already shown in FIGS. 1a-f) will be replaced by the preferred layer configurations i) and ii) written below, wherein each is formed by successive layer depositions using a deposition method such as sputtering and a natural oxidation method for the formation of the specularly reflecting TaOx layer (as shown in FIGS. 3a-c and 4a-c).

First Preferred Embodiment Configuration i) NiCr(55)/MP(125)/CoFe(15)/Ru(7.5)/CoFe(20)/Cu(18)/SL/CoFe(5)—NiFe(20)/Ru(10)/Ta(5-7.5)/NOL/Ta(25)/Ru(10)

Second Preferred Embodiment Configuration ii) NiCr(55)/MP(100)/CoFe(13)/Ru(7.5)/CoFe(15)/Cu(18)/SL/CoFe(17)/Cu(3-5)/CoFe(3)/Ru(5)/Ta(5-7.5)/NOL/Ta(15)/Ru(10)

Prior Art Configuration iii) NiCr(55)/MP(125)/CoFe(15)/Ru(7.5)/CoFe(20)/Cu(18)/SL/CoFe(5)—NiFe(20)/Ru(10)/Ta(30)/Ru(10)

The numbers in parentheses above are layer thicknesses in angstroms, "NOL" refers to the naturally oxidized layer of the present invention and "SL" refers to a surfactant layer.

In configuration ii) a laminated free layer is provided comprising an ultra-thin CoFe(17) free layer on which is formed a 3 angstrom Cu layer and on which is formed a 3 angstrom thick CoFe layer. This configuration gives high output at even higher density recordings than would be provided by the CoFe—NiFe configuration of i). In configuration i) the high-conductance layer (HCL) and oxygen diffusion barrier is Ru(10). In configuration ii), the HCL is Ru(5). It is understood that both Cu and Ru may be used as high-conductance layers as may layers of other highly conducting materials.

It is noted that the particular effectiveness of a CoFe layer alone as in ii) is due to the spin-dependent scattering properties of CoFe as compared to NiFe, where the CoFe shows a greater contrast between the scattering of spin up and spin down conduction electrons.

Figure 2:
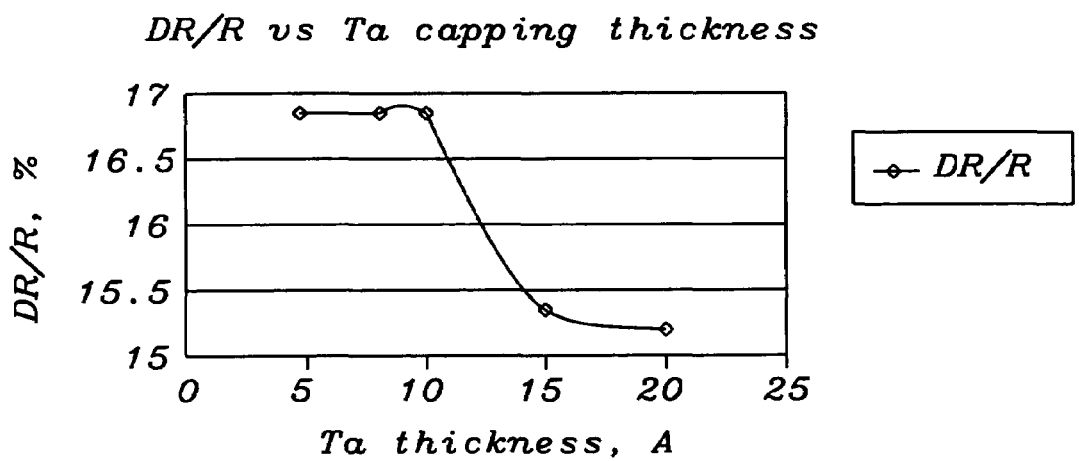
FIG. 2 is a graphical representation of the effectiveness of varying thicknesses of oxidized Ta as a capping layer.
Figure 3A:
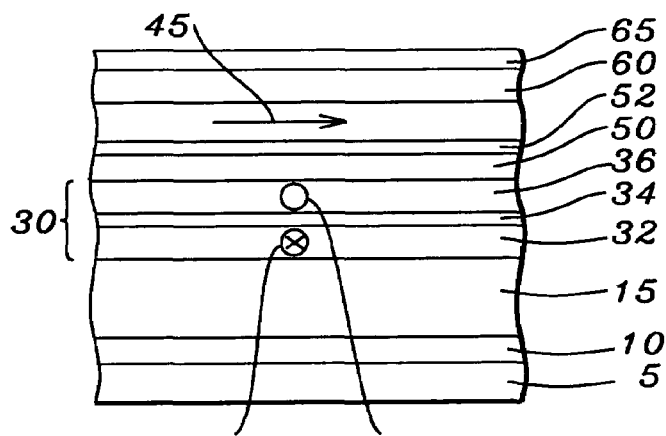
FIGS. 3a-c are schematic drawings of the formation of a sensor stack configuration and its patterning according to a first preferred embodiment of the present invention.

Referring now to FIG. 3a, there is seen in a schematic cross-sectional view through an air-bearing surface (ABS) plane the initial steps in forming the stack configuration described in i) above. Moving vertically upward in FIG. 3a, there is first seen a substrate (5) on which has been formed NiCr buffer layer (10), having approximately 40% Cr by atomic weight and formed to a thickness of between approximately 50 and 60 angstroms, with approximately 55 angstroms being preferred. The antiferromagnetic pinning layer (15) formed on (10) is preferably a layer of antiferromagnetic material such as MnPt and is formed to a thickness between approximately 100 and 150 angstroms, with approximately 125 angstroms being preferred. The SyAF (synthetic antiferromagnetic) pinned layer (30) is preferably a trilayer comprising a second ferromagnetic layer (32), a first ferromagnetic layer (36) and a coupling layer (34) of a non-magnetic material and critical thickness designed to couple the magnetic moments of the ferromagnetic layers in antiparallel directions during a subsequent annealing process. In the present preferred embodiment the second and first ferromagnetic layers are both formed of CoFe, the second layer (32) being formed to a thickness between approximately 13 and 20 angstroms with 15 angstroms being preferred and the first layer (36) being formed to a thickness between approximately 15 and 25 angstroms with approximately 20 angstroms being preferred. The coupling layer (34) producing the antiparallel magnetic moment configuration is a layer of Ru formed to a thickness of approximately 7.5 angstroms. This is a critical thickness as it is required to make the antiparallel configuration energetically favorable and a variation of no more than +/−1.0 angstroms is permissable.

The magnetic moments of the two ferromagnetic layers, which are subsequently set by an annealing process, have already been indicated (even though the annealing process has not yet occurred) as oppositely directed arrows (circle (40) and circle with cross (43)) normal to the cross-sectional plane of the drawing and respectively out of and into the plane (the transverse direction). The non-magnetic spacer layer (50) separating the pinned layer from the free layer is a layer of Cu formed to a thickness between approximately 16 and 20 angstroms, with approximately 18 angstroms preferred. The spacer layer is formed in an oxygen ambient so that a very thin layer (atomic mono-layer) of oxygen (52) is adsorbed on the surface distal from the pinned layer. This is the oxygen surfactant layer which both promotes adhesion and improves the structure of the subsequently formed free layer.

As noted above, the spacer layer is a region of spin-dependent scattering of conduction electrons and its material composition and thickness is critical to obtaining the GMR effect of the sensor. The ferromagnetic free layer (60) is formed on the oxygen surfactant layer of the spacer layer. This layer is a composite of CoFe—NiFe in which the CoFe is formed to a thickness between approximately 5 and 10 angstroms with approximately 5 angstroms being preferred and the NiFe being formed to a thickness between approximately 15 and 25 angstroms, with approximately 20 angstroms being preferred. The magnetization of the free layer is ultimately set in the plane of the ABS and is already indicated in the figure as arrow (45). Layers (10)-(60) inclusive are indicated collectively as (200). A high-conductance layer (HCL) (65) is then formed on the free layer, the HCL being a layer of Ru formed to a thickness between approximately 5 and 10 angstroms with approximately 10 angstroms being preferred. As already noted in connection with the formation of the prior art sensor, the purpose of the HCL layer is to direct the sensing current along the free layer and, thereby, to significantly reduce or eliminate the magnetic field of the sensing current as a mechanism for adversely affecting the free layer bias point. It is further noted that a layer of Cu or a layer of Ru or a layer comprising laminates or composites of Cu and Ru may also form suitable HCLs meeting the objects of the invention. In the following figures, layers (10)-60) inclusive will be denoted (200).

Figure 3B:
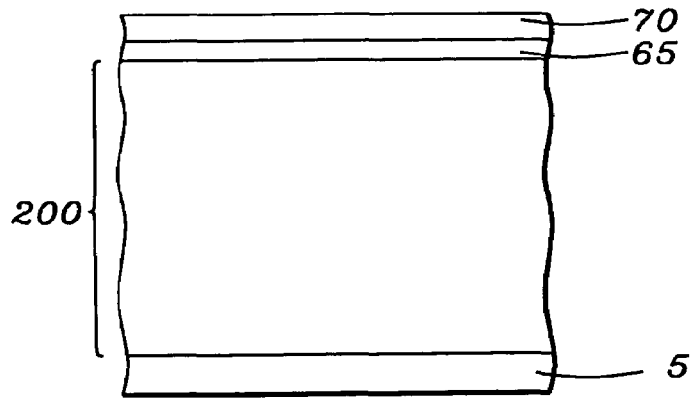

Referring next to FIG. 3b, there is shown the formation of a Ta specularly reflecting layer (70) on the Ru HCL (65), the layer being formed with a thickness between approximately 5 and 7.5 angstroms with approximately 5 angstroms being preferred. At this point a significant and novel step of the present invention occurs, which is the natural (no plasma), in-situ oxidation of the Ta layer (70) in a TIM module (a chamber designed for oxidation processes) with an oxygen pressure of between approximately 50 and 75 millitorr for approximately 5 minutes. This is the layer referred to as "NOL" above.

Figure 3C:
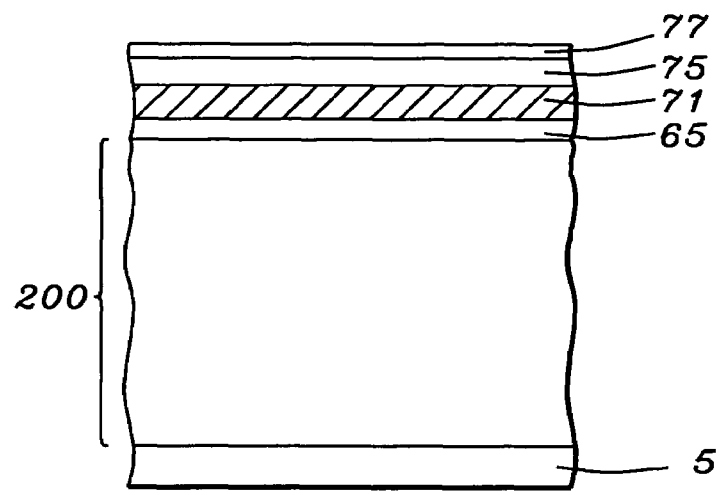

Referring next to FIG. 3c, there is shown the now naturally oxidized TaOx specularly reflecting layer (NOL) (71) making direct contact with the Ru HCL, forming, thereby, a uniform specularly reflecting layer. It is noted that even within this natural oxidation process, the Ru HCL also serves to prevent $O_2$ from reaching the free layer. It is further noted that a Cu layer, which is used as a HCL when the free layer is CoFe, also serves to prevent oxygen diffusion.

Finally, an additional capping layer is formed on the naturally oxidized TaOx layer (71), the additional capping layer being a Ta layer (75) approximately 15-25 angstroms thick with approximately 25 angstroms being preferred, on which is formed a Ru layer (77) between approximately 10 and 20 angstroms in thickness with approximately 10 angstroms being preferred. The Ru layer (77) will protect the stack from delamination during annealing to set the pinned layer magnetizations (the annealing step is not shown in the figures).

The sensor patterning steps and deposition of hard bias and conducting lead layers illustrated in FIGS. 1c-1f when applied to the prior art sensor stack iii), are now applied identically to the stack formation of FIG. 3c. Because the NOL is already present and making contact with the free layer, the argon/oxygen plasma step taught in FIG. 1e can leave the additional Ta capping layer (75) under-oxidized with no adverse affects to the sensor performance.

Figure 4A:
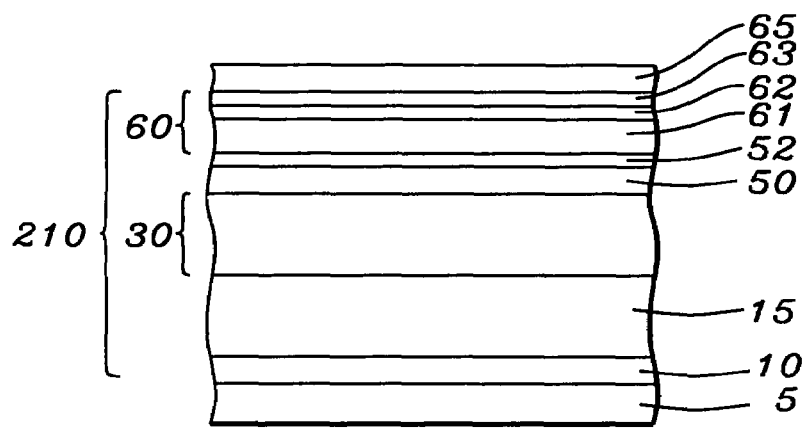
FIGS. 4a-c are schematic drawings of the formation of a sensor stack configuration and its patterning according to a second preferred embodiment of the present invention.

Referring next to FIG. 4a, there is shown a schematic cross-sectional view through an air-bearing surface (ABS) plane of the second preferred embodiment, ii), of the present invention. In this embodiment, the substrate (5), the seed layer (10), the antiferromagnetic pinning layer (15), the SyAF pinned layer (30), the spacer layer (50) and the oxygen surfactant layer (52) are formed identically to their counterparts in FIG. 3a. The free layer (60), however, differs substantially and, in this second preferred embodiment is a laminated layer comprising a first CoFe layer (61), formed to a thickness between approximately 15 and 20 angstroms, with approximately 17 angstroms being preferred, a second CoFe layer (63), formed to a thickness between approximately 2 and 4 angstroms, with approximately 3 angstroms being preferred and a Cu high-conductance layer (HCL) (62), formed between the two CoFe layers, to a thickness between approximately 2 and 4 angstroms, with approximately 3 angstroms being preferred. The free layer so formed is found to be suitable for even higher density recordings than other free layers. Layers (10)-(60) inclusive are hereinafter designated collectively as (210). A Ru HCL (65) is then formed on the second CoFe layer with a thickness of between approximately 5 and 7.5 angstroms with approximately 5 angstroms being preferred. It is understood that both Cu and Ru may be used as high-conductance layers as may layers of other highly conducting materials.

Figure 4B:
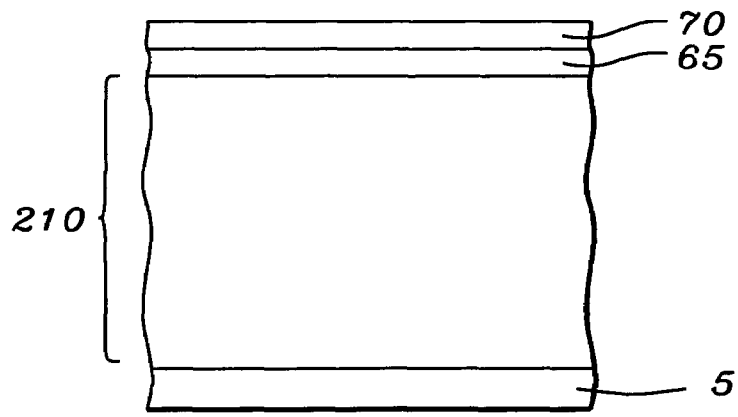

Referring now to FIG. 4b, there is shown the formation on the Ru layer (65) of an approximately 5 angstroms thick Ta specularly reflecting layer (70), which is to be naturally oxidized, and which is formed identically to the Ta layer (70) of FIG. 3b.

Figure 4C:
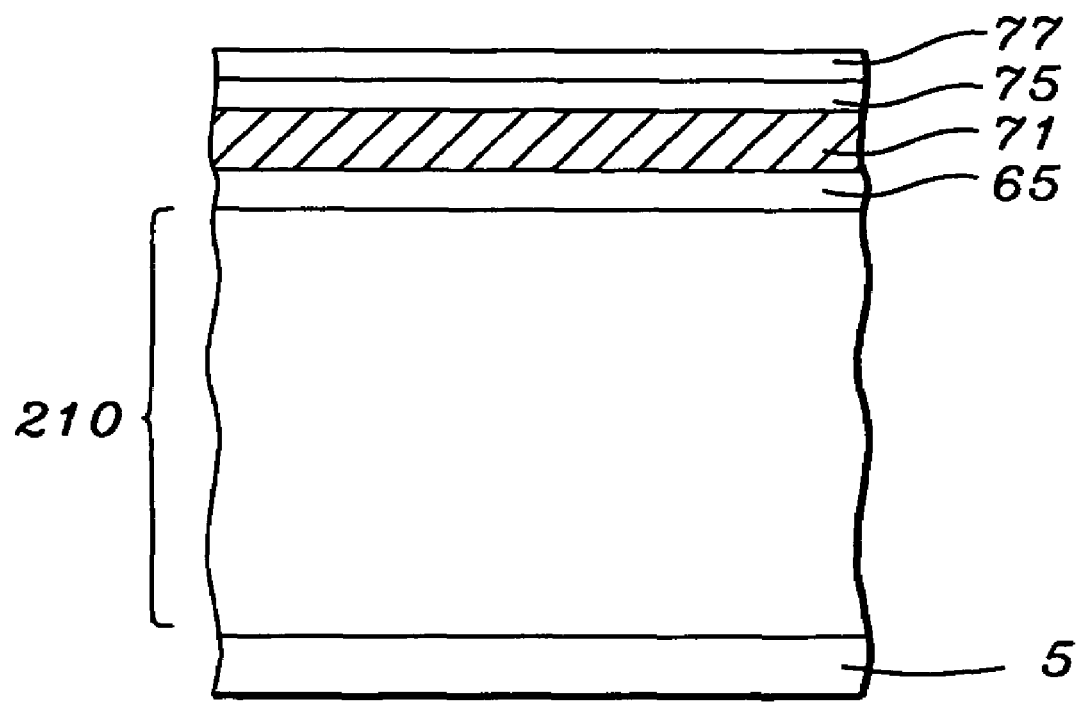

Referring next to FIG. 4c, there is shown the Ta layer, which was layer (70) in FIG. 4b, now having been naturally oxidized to form a naturally oxidized TaOx layer (NOL) (71). The oxidation process proceeds in a TIM module with an oxygen pressure between approximately 50-75 millitorr for a time of approximately 5 minutes. Subsequent to this oxidation process, an additional Ta capping layer (75), of thickness between approximately 15 and 25 angstroms with approximately 15 angstroms being preferred is formed on the NOL and a Ru capping layer (77), of thickness between approximately 10 and 20 angstroms, with approximately 10 angstroms being preferred, is formed on that Ta layer.

The sensor patterning steps and deposition of hard bias and conducting lead layers illustrated in FIGS. 1c-1f as applied to the prior art sensor stack iii), are now applied identically to the stack formation of FIG. 4c. Because the NOL is already present and making contact with the free layer, the argon/ oxygen plasma step taught in FIG. 1e can leave the additional Ta capping layer (75) under-oxidized with no adverse affects to the sensor performance. This is an important advantage of the present invention as it renders the argon/oxygen plasma step less critical in terms of whether the Ta layer (75) is under or over-oxidized.

Experiments have been carried out to determine the magnetic performance properties of configurations i), ii) and the reference iii). Although many properties were measured, the coercivity of the free layer, $H_c$, and the GMR ratio, dR/R, are good indications of sensor performance. These characteristics are listed in the table below:

| Sample | $H_c$ | dR/R |
|---|---|---|
| i) | 12.94 | 13.04 |
| ii) | 7.74 | 14.85 |
| iii) | 12.88 | 12.40 |

It can be seen that the configuration ii) has a very soft free layer (low coercivity) and a high GMR ratio. Configuration i), which has the same CoFe—NiFe free layer as configuration iii) has a similar coercivity, but a significantly improved GMR ratio.

As is understood by a person skilled in the art, the preferred embodiments of the present invention are illustrative of the present invention rather than limiting of the present invention. Revisions and modifications may be made to methods, materials, structures and dimensions employed in fabricating and providing a bottom spin valve (BSV) giant magnetoresistive (GMR) sensor of the spin filter spin-valve (SFSV) type having a high-conductance layer, a synthetic antiferromagnetic (SyAF) pinned layer and a naturally oxidized specularly reflecting capping layer, while still fabricating and providing such a bottom spin valve (BSV) giant magnetoresistive (GMR) sensor of the spin filter spin-valve (SFSV) type having a high-conductance layer, a synthetic antiferromagnetic (SyAF) pinned layer and a naturally oxidized specularly reflecting layer, in accord with the spirit and scope of the present invention as defined by the appended claims.

What is claimed is:

1. A bottom spin valve (BSV) giant magnetoresistive (GMR) sensor of the spin filter spin-valve (SFSV) type having an in-situ naturally oxidized specularly reflecting layer, a high-conductance layer, a synthetic antiferromagnetic (SyAF) pinned layer and a laminated ferromagnetic free layer comprising:

a substrate;
a bottom spin valve stack of the SFSV type formed on the substrate, said stack further comprising:
a buffer layer;
an antiferromagnetic pinning layer formed on said buffer layer;
a synthetic antiferromagnetic (SyAF) pinned layer formed on said pinning layer;
a spacer layer formed on said SyAF pinned layer;
an oxygen surfactant layer formed on said spacer layer;
a laminated free layer of ferromagnetic and non-ferromagnetic materials formed on said oxygen surfactant layer;
a high-conductance layer (HCL) formed on said free layer;
a specularly reflecting layer formed, in-situ, as a naturally oxidized layer (NOL) formed on said HCL;
a capping layer formed on said NOL, the surface of said capping layer distal from said NOL being oxidized; and
said pinned layer being magnetized in a direction transverse to an air bearing surface plane of said sensor.

2. The sensor of claim 1 wherein said buffer layer is a layer of NiCr, of approximately 40% Cr by atomic weight, formed to a thickness between approximately 50 and 60 angstroms.

3. The sensor of claim 1 wherein said pinning layer is a layer of MnPt formed to a thickness between approximately 100 and 150 angstroms.

4. The sensor of claim 1 wherein the synthetic antiferromagnetic pinned layer further comprises:
a second ferromagnetic layer on said pinning layer;
a non-magnetic antiferromagnetically coupling layer formed on said first ferromagnetic layer;
a first ferromagnetic layer formed on said coupling layer.

5. The sensor of claim 4 wherein said second ferromagnetic layer is a layer of CoFe formed to a thickness of between approximately 13 and 20 angstroms, and said first ferromagnetic layer is a layer of CoFe formed to a thickness of between approximately 15 and 25 angstroms.

6. The sensor of claim 4 wherein said non-magnetic antiferromagnetically coupling layer is a layer of Ru formed to a thickness of between approximately 7 and 8 angstroms.

7. The sensor of claim 1 wherein said non-magnetic spacer layer is a layer of Cu formed to a thickness of between approximately 16 and 20 angstroms and an atomic layer of oxygen adsorbed on a surface distal to said SyAF layer acts as a surfactant layer.

8. The sensor of claim 1 wherein said laminated free layer further comprises:
a first layer of CoFe formed to a thickness between approximately 15 and 20 angstroms;
a layer of Cu formed on said first CoFe layer to a thickness between approximately 2 and 4 angstroms;
a second layer of CoFe formed on said Cu layer to a thickness between approximately 2 and 4 angstroms.

9. The sensor of claim 1 wherein said high-conductance layer (HCL) is a layer of Ru formed to a thickness between approximately 4 and 6 angstroms.

10. The sensor of claim 1 wherein said naturally oxidized specularly reflecting layer is formed, in-situ, by a process further comprising:
forming a layer of Ta on said HCL;
exposing said Ta layer to certain pressure of oxygen in a TIM module, for an amount of time sufficient to completely oxidize said layer.

11. The sensor of claim 10 wherein said Ta layer is deposited to a thickness between approximately 5 and 7.5 angstroms.

12. The sensor of claim 10 wherein said TIM module is pressurized to between approximately 50 and 75 millitorr and the amount of time required to oxidize said layer is approximately 5 minutes.

13. The sensor of claim 1 wherein said capping layer is a layer of Ta formed to a thickness between approximately 15 and 25 angstroms before oxidation.

14. The sensor of claim 1 further comprising sensor junctions and hard bias layers and conducting lead layers formed contiguous with said junctions, the distance between said junctions defining a physical trackwidth.

* * * * *